United States Patent
Mizutani

Patent Number: 6,158,407
Date of Patent: Dec. 12, 2000

[54] CYLINDER LINER AND METHOD FOR ITS PRODUCTION

[75] Inventor: Kazunori Mizutani, Tokyo, Japan

[73] Assignee: Teikoku Piston Ring, Co., Ltd., Tokyo, Japan

[21] Appl. No.: 09/185,541

[22] Filed: Nov. 4, 1998

[30] Foreign Application Priority Data

Nov. 19, 1997 [JP] Japan ................................. 9-335030

[51] Int. Cl.⁷ ........................................... F16J 10/04
[52] U.S. Cl. ........................................................ 123/193.2
[58] Field of Search ........................... 123/193.2, 193.3, 123/668; 29/888.061

[56] References Cited

U.S. PATENT DOCUMENTS 4,706,616  11/1987  Yoshimitsu ........................ 123/193.2

FOREIGN PATENT DOCUMENTS

| | | |
|---|---|---|
| 50-51052 | 5/1975 | Japan . |
| 55-017760 | 2/1980 | Japan . |
| 55-17760 | 2/1980 | Japan . |
| 58-98641 | 6/1983 | Japan . |
| 60-147736 | 10/1985 | Japan . |
| 62-26444 | 7/1987 | Japan . |

*Primary Examiner*—Marguerite McMahon
*Attorney, Agent, or Firm*—Smith Gambrell & Russell, LLP

[57] ABSTRACT

A cylinder liner which comprises an inner face, wherein a portion of the inner face in the vicinity of a top dead center of a top ring is a phosphate coating which is obtained by mechanically removing a crystal layer formed by a treatment with a phosphate, and the lower portion of the inner face is a cast-iron face; and a method for its production.

9 Claims, 1 Drawing Sheet

CYLINDER LINER AND METHOD FOR ITS PRODUCTION

BACKGROUND OF THE INVENTION (1) Field of the Invention

The present invention relates to a cylinder liner used for reciprocating internal combustion engines, which is excellent in both the consumption performance of lubricating oil and seizure resistance, and a method for producing it.

(2) Background Information

The cylinder liner of reciprocating internal combustion engines such as engines, is a part to which most complex forces are applied in the internal combustion engines, such as impact force, thermal stress or combustion gas pressure along with the sliding of a piston. Accordingly, the cylinder liner is made of a material excellent in e.g. wear resistance and thermal resistance, and particularly the inner face of the cylinder liner is processed so that good lubricating properties and seizure resistance can be obtained.

For example, if the surface roughness of the cylinder liner is made large, the lubricating oil consumption tends to increase, and if made small, seizure of the piston ring and cylinder liner is likely to occur, whereby the surface roughness of the cylinder liner is usually adjusted to a range of from 1.2 to 4.0 $\mu$mRz.

On the other hand, along the regulation of exhaust gas in recent years, it has been demanded to further reduce the lubricating oil consumption of internal combustion engines, whereas it has been further strongly demanded to obtain higher output than the past. To cope with such situation, various improvements have been made with respect to the cylinder liner.

In order to improve the lubricating oil consumption performance and seizure resistance, as a technic wherein surface characteristics of a sliding face of a cylinder liner are improved to reduce the lubricating oil consumption, a technic wherein the surface roughness of the inner face at the upper portion of the cylinder liner is made higher than the surface roughness of the inner face at the lower portion (Japanese Unexamined Utility Model Publication No. 60-147736), and a technic wherein the surface roughness of the inner face of a cylinder is reduced at the portion in the vicinity of a top dead center of a top ring (Japanese Patent Publication No. 2-32462), have been known.

However, in the cylinder liners of these conventional technics, the sliding face is entirely a cast-iron face, and the surface roughness is simply partially changed, whereby the improvements in the lubricating oil consumption performance and seizure resistance, are limitative, and accordingly can not meet the demands for the regulation of exhaust gas. Further, with honing process, it is difficult to produce cylinder liners having the surface roughness partially changed on an industrial scale, whereby it has been difficult to realize such cylinder liners.

Under such circumstances, as the ones wherein the above technics have been improved, a technic wherein a phosphate coating is formed on the entire inner face of a cylinder liner (Japanese Unexamined Utility Model Publication No. 50-51052), and further a technic wherein the inner face of a cylinder liner to which a phosphate coating is applied, is shallowly etched (Japanese Utility Model Publication No. 62-26444), have been known.

However, the phosphate coating is composed of a chemical conversion layer, and at its surface, a crystal layer of a phosphate is formed, and below the surface, etching pockets are formed by local dissolution of a base material. In the etching pockets, a so-called amorphous layer which is excellent in oil-retaining properties, is formed. However, the crystal layer at the surface has a Mohs hardness of 6 to 7, and is accordingly hard and brittle, whereby there is a problem that the crystal surface tends to hurt metals and a piston made of a soft metal. Accordingly, Japanese Patent Publication No. 57-61954 discloses technic wherein the crystal layer of a phosphate is mechanically removed and a porous chemical conversion layer (amorphous layer) is allowed to remain in the etching pockets.

The depth of the etching pockets is represented by the surface roughness of the exposed cast-iron face from which the phosphate coating is peeled off with a chromic acid solution, or by a load curve of the surface roughness. In each of Japanese Utility Model Publications No. 57-61954 and No. 62-26444, the surface roughness of the etching pocket portion of the phosphate coating of the cylinder liner, is controlled to be from 3 to 8 $\mu$mRz, from the viewpoint of the balance of the durability in the seizure resistance and lubricating oil consumption, and the surface roughness of the remaining phosphate coating after the crystal layer is removed, is usually from 0.5 to 3.2 $\mu$mRz.

However, the above technics have the following problems. If a phosphate coating with a shallow etching pocket is formed in view of the importance of the lubricating oil consumption performance, the seizure resistance at the portion in the vicinity of the top dead center of the top ring tends to be inadequate. On the other hand, if a phosphate coating with a deep etching pocket is formed in view of the importance of the seizure resistance, when the engine is operated, etching pocket portions, graphite portions of cast-iron or perlite matrix portions at the lower portion of the cylinder liner tend to fall off by the sliding of the piston ring, whereby the surface roughness gradually increases and resultingly the lubricating oil consumption will gradually increase.

SUMMARY OF THE INVENTION

It is an object of the present invention to solve the above problems, and to provide a cylinder liner excellent in the lubricating oil consumption performance and seizure resistance, and a method for its production.

The above object has been accomplished by the present invention which provides a cylinder liner which comprises an inner face, wherein a portion of the inner face in the vicinity of a top dead center of a top ring is a phosphate coating which is obtained by forming a crystal layer formed by a treatment with a phosphate and mechanically removing the crystal layer, and the lower portion of the inner face is a cast-iron face.

According to the present invention, at the portion of the inner face of the cylinder liner, in the vicinity of the top dead center of the top ring at which the starting point of seizure tends to form, a crystal layer at the surface formed by a phosphate treatment is mechanically removed and a phosphate coating below the crystal layer remains, whereby the seizure (scuffing) can be prevented by the oil-retaining properties of the etching pockets of the phosphate coating during the initial to medium period of operation. During these periods, the outer face of the piston ring and the inner face of the cylinder liner are formed to have optimum face properties to each other, whereby the seizure resistance and the wear resistance can be maintained for a long period of time even if the etching pockets are weared and lost after the medium period.

Further, the lower portion of the inner face of the cylinder liner at which most of the lubricating oil is consumed, is made of a cast-iron face, whereby the wear resistance is excellent and the lubricating oil consumption can be suppressed over a long period of time.

In the present invention, the surface roughness of the inner face from which the phosphate coating of etching pockets is peeled off, is preferably from 1.2 to 6.0 μmRz. If the surface roughness is less than 1.2 μmRz, the seizure resistance can not be maintained for a long period of time, and if it exceeds 6.0 μmRz, the lubricating oil consumption tends to increase, such being undesirable.

Further, the surface roughness of the phosphate coating which is obtained by mechanically removing a crystal layer formed by a treatment with a phosphate, is preferably from 0.5 to 3.2 μmRz, more preferably from 0.6 to 2.0 μmRz. If the surface roughness exceeds 3.2 μmRz, there are problems that a long time is required for early fitting, and for such a period, the lubricating oil consumption will be increased. Further, to make the surface roughness less than 0.5 μmRz, it is required to mechanically remove the crystal layer at such a level that the cast-iron face is exposed, whereby minute burrs or fins of the cast-iron are formed, which cause the seizure, such being undesirable.

Furthermore, the surface roughness of the cast-iron face is preferably from 0.6 to 1.8 μmRz, more preferably from 0.8 to 1.2 μmRz. If the surface roughness is less than 0.6 μmRz, seizure at the early time tends to cause, and if it exceeds 1.8 μmRz, there is a problem that the lubricating oil consumption tends to increase, such being undesirable.

The present invention also provides a method for producing a cylinder liner, which comprises forming an inner face of a cylinder liner with a surface roughness of from 0.6 to 2.0 μmRz, treating a portion of the inner face in the vicinity of a top dead center of a top ring with a phosphate, mechanically removing a crystal layer of a phosphate to form a phosphate coating of a surface roughness of from 0.5 to 3.2 μmRz, and at the same time, treating the cast-iron face of the lower portion of the inner face so that it has a surface roughness of from 0.6 to 1.8 μmRz.

According to the method of the present invention, the portion of the inner face of the cylinder liner in the vicinity of a top dead center of a top ring, is a face having a surface roughness of from 0.5 to 3.2 μmRz, which is formed by mechanically removing a crystal layer of a phosphate; and the lower portion of the inner face of the cylinder liner is a face having a surface roughness of from 0.6 to 1.8 μmRz. As mentioned above, by usual honing processing, at the portion in the vicinity of the top dead center of the top ring, a highly oil-retaining face is formed by mechanically removing a crystal layer of a phosphate, and at the lower portion of the cylinder liner, a cast-iron face which is excellent in the lubricating oil consumption performance and has a small surface roughness, can be obtained.

DESCRIPTION OF THE PREFERRED EMBODIMENTS

Figure 1:
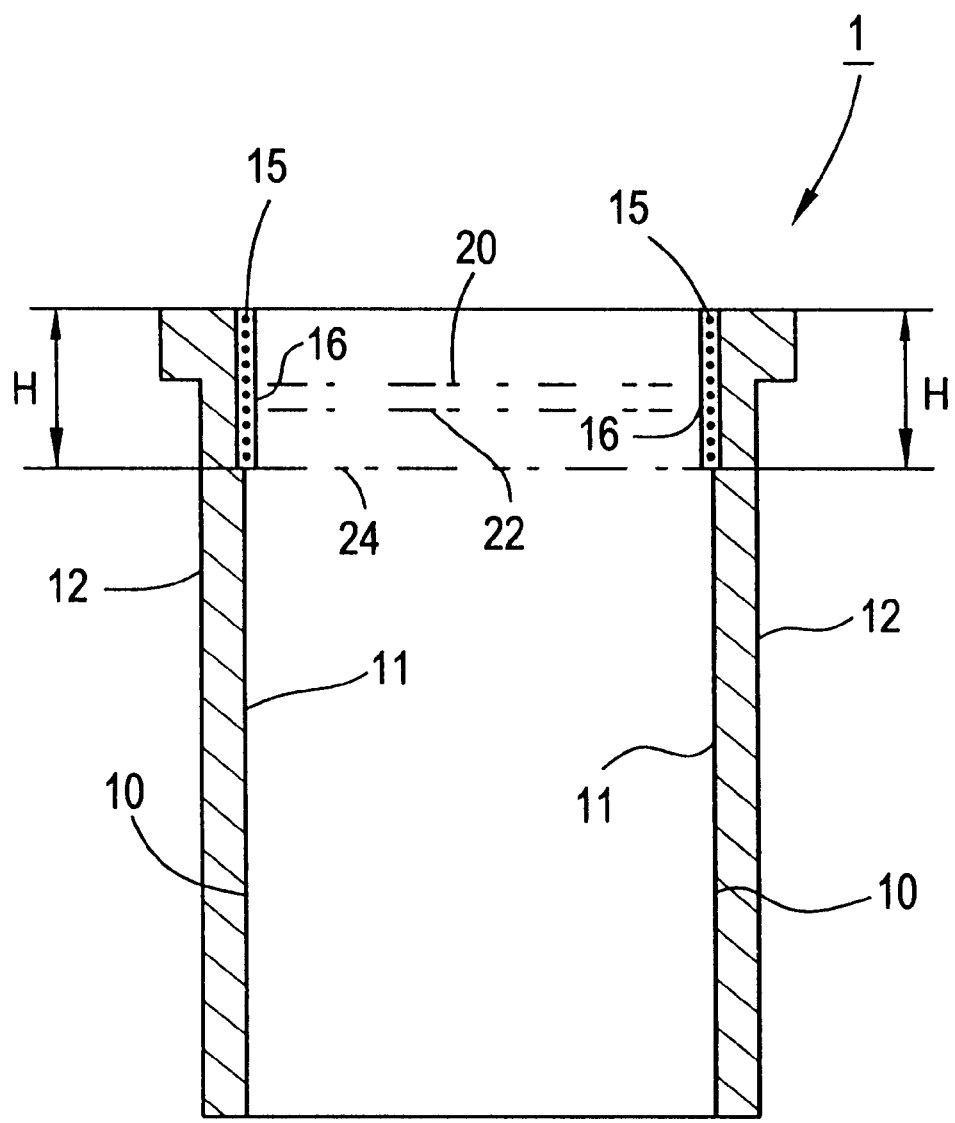
FIG. 1 is a sectional view of a cylinder liner in one embodiment of the present invention.

Hereinafter, the present invention will be described in further detail with reference to the drawing.

FIG. 1 shows a sectional view of a cylinder liner in one embodiment of the present invention. 1 is a cylinder liner body.

In the present invention, as the material for the cylinder liner body 1, cast iron for conventional cylinder liners, can be used. After molding the cast iron and processing the inner face 10 and the outer face 12 of the cylinder liner with a machine, the inner face 10 of the cylinder liner is subjected to honing processing to form a face with the surface roughness of from 0.6 to 2.0 μmRz.

Then, the portion H in the vicinity of the top dead center of the inner face 10 of the cylinder liner, is etched with, for example, a chemical containing manganese phosphate as the main component, preferably under the treatment conditions such that the temperature is from 97 to 98° C., for about 15 minutes, to form a phosphate coating 15. As a method for partially treating with a phosphate, a method wherein the cylinder liner is simply stood upside down and immersed in a phosphate treating liquid in a predetermined depth, may be mentioned, or a masking method usually used for a wet-type surface treatment, may be used.

Then, the surface of the phosphate coating 16 and the lower portion of the inner face of the cylinder liner (a cast-iron face at the inner face side of the cylinder liner which is not treated with a phosphate) are subjected to honing processing with grinding stones (cork grinding stones) having grinding particles such as carborumdum, green carborumdum or white alundum, contained in cork particles.

On the surface of the phosphate coating 16, processed by honing processing, the crystal layer is removed and the surface roughness is from 0.5 to 3.2 μmRz. Further, at the same time, the cast-iron face of the lower portion of the inner face of the cylinder liner, is polished to have a surface roughness of from 0.6 to 1.8 μmRz, whereby the cylinder liner of the present invention is obtained.

The cylinder liner thus obtained, has an excellent seizure resistance by the oil-retaining property of the phosphate layer from which the crystal layer is removed, at the portion in the vicinity of the top dead center of the top ring, and can maintain excellent lubricating oil consumption for a long period of time by the cast-iron face at the lower portion of the inner face of the cylinder liner, having a surface roughness of from 0.6 to 1.8 μmRz.

The portion to be subjected to the treatment with a phosphate, namely the portion in the vicinity of the top dead center of the top ring 20 as defined in the present invention, preferably includes the top dead center of a second ring 22 in the case of usual engines, or above the top dead center of an oil ring 24 in the case of high thermal-load engines.

EXAMPLE 1 AND COMPARATIVE EXAMPLES 1 AND 2

A cylinder liner obtained by the production method of the present invention is referred to as Example 1; a cylinder liner not subjected to a treatment with a phosphate is referred to as Comparative Example 1; and a cylinder liner where a treatment with a phosphate is made over the whole inner face of the cylinder liner and then the crystal layer of a phosphate is removed, is referred to as Comparative Example 2. The surface conditions of respective portions of each example or comparative example are indicated in Table 1. The surface roughness of each portion of the table was formed by honing processing.

TABLE 1

(Surface conditions of the cylinder liner)

Example 1

In the vicinity of the top dead center
Sliding face: a phosphate coating from which a crystal
layer was removed
Surface roughness: 1.2 μmRz
At the lower portion
Sliding face: cast-iron face
Surface roughness: 1.2 μmRz
Comparative Example 1

In the vicinity of the top dead center
Sliding face: cast-iron face
Surface roughness: 3.3 μmRz
At the lower portion
Sliding face: cast-iron face
Surface roughness: 3.1 μmRz Comparative Example 2
In the vicinity of the top dead center
  Sliding face: a phosphate coating from which a crystal layer was removed
  Surface roughness: 1.2 μmRz
At the lower portion
  Sliding face: a phosphate coating from which a crystal layer was removed
  Surface roughness: 1.2 μmRz
Note: The surface roughness where the phosphate coating is peeled off in Example 1: 3.2 μmRz
  The surface roughness where the phosphate coating is peeled off in Comparative Example 2: 7.5 μmRz

TEST EXAMPLE 1

For confirmation of the effects of the present invention, in experiments using an engine, the changes of the lubricating oil consumption with time were measured with respect to Example 1, Comparative Example 1 and Comparative Example 2. The results are indicated in Table 3. The major numerical values of the engine used are indicated in Table 2.

TABLE 2

Displacement: 16 liters
Arrangement of cylinders: V8
Operation conditions of engine Number of rotations: 2,300 rpm
Load: 4/4

TABLE 3

(Results of experiments)

| Lubricating oil | Ex.1 | Comp.Ex.1 | Comp.Ex.2 |
| --- | --- | --- | --- |
| consumption at the initial stage (g/h) | 29 | 48 | 46 |
| consumption after operation of 1,000 hrs (g/h) | 33 | 52 | 63 |

As evident from the results of Table 3, the lubricating oil consumption can be substantially reduced by the cylinder liner of the present invention.

TEST EXAMPLE 2

For confirmation of the effects of the present invention, in the experiments using an engine, the seizing conditions were inspected with respect to the cylinder liners of Example 1, Comparative Example 1 and Comparative Example 2. In these experiments, the engine used was similar to the one used in TEST EXAMPLE 1. After the engine was operated under the high oil and water temperature conditions (water temperature: 112° C., the oil temperature was not controlled) for 50 hours, the cylinder liner was taken out and the sliding face was inspected.

As a result, no seizure was observed in the cylinder liners of Example 1 and Comparative Example 2, but seizure was observed in the vicinity of the top dead center of the top ring in two cylinders among 8 cylinders in Comparative Example 1.

As described above, according to the present invention, at the portion of the inner face of the cylinder liner, in the vicinity of the top dead center of the top ring at which the starting point of seizure tends to form, a crystal layer at the surface formed by a phosphate treatment is mechanically removed and a phosphate coating below the crystal layer remains, and the lower portion of the inner face of the cylinder liner at which most of the lubricating oil is consumed, is made of a cast-iron face, whereby a cylinder having a low lubricating oil consumption and an excellent seizure resistance, can be obtained. Further, the hard and brittle crystal layer is completely mechanically removed, whereby it is possible to prevent from damaging the outer face of a piston, the sliding face of a cylinder liner or the sliding face of a cylinder liner.

What is claimed is:

1. A cylinder liner which comprises an inner face, wherein an upper portion of the inner face, including an upper top dead center of a top ring, is a phosphate coating which is obtained by mechanically removing a crystal layer formed by a treatment with a phosphate, and a lower portion of the inner face is a cast-iron face.

2. The cylinder liner according to claim 1, wherein the surface roughness of the inner face from which the phosphate coating is peeled off is from 1.2 to 6.0 μmRz; and the surface roughness of the phosphate coating is from 0.5 to 3.2 μmRz.

3. The cylinder liner according to claim 1, wherein the surface roughness of the cast-iron face of the lower portion of the inner face is from 0.6 to 1.8 μmRz.

4. The cylinder liner according to claim 1, wherein the top dead center of a top ring is above the top dead center of a second ring.

5. The cylinder liner according to claim 1, wherein the top dead center of a top ring is above the top dead center of an oil ring.

6. A method for producing a cylinder liner comprising:
  forming an inner face of a cylinder liner with a surface roughness of from 0.6 to 2.0 μmRz,
  treating an upper portion of the inner face including a top dead center of a top ring with a phosphate,
  mechanically removing a crystal layer of a phosphate to form a phosphate coating of a surface roughness of from 0.5 to 3.2 μmRz, and at the same time, treating the cast-iron face of a lower portion of the inner face so that it has a surface roughness of from 0.6 to 1.8 μmRz.

7. A method for producing a cylinder liner comprising:
  forming an inner face of a cylinder liner with a surface roughness of from 0.6 to 2.0 μmRz,
  treating an upper portion of the inner face including a top dead center of a top ring with a phosphate to form a phosphate coating comprising a crystal layer at the surface and etching pockets, mechanically removing the crystal layer to form a remaining phosphate coating of etching pockets with a surface roughness of from 0.5 to 3.2 μmRz, and at the same time, treating the cast-iron face of a lower portion of the inner face so that it has a surface roughness of from 0.6 to 1.8 μmRz.

8. The cylinder liner according to claim 4, wherein the upper portion includes the top dead center of the second ring.

9. The cylinder liner according to claim 5, wherein the upper portion includes the top dead center of the oil ring.

* * * * *